United States Patent [19]

Villa

[11] 4,017,554

[45] Apr. 12, 1977

[54] EPOXIDE MODIFIED POLYSULFIDE POLYMERS AS ADHESIVE ADDITIVES FOR LIQUID POLYSULFIDE POLYMER BASED ADHESIVE COMPOSITIONS

[75] Inventor: Jose L. Villa, Heightstown, N.J.

[73] Assignee: Thiokol Corporation, Newtown, Pa.

[22] Filed: Oct. 14, 1975

[21] Appl. No.: 622,339

Related U.S. Application Data

[60] Continuation of Ser. No. 377,161, July 6, 1973, abandoned, which is a division of Ser. No. 252,646, May 12, 1972, Pat. No. 3,813,368.

[52] U.S. Cl. .............................. 260/830 S; 260/79; 260/823; 428/411
[51] Int. Cl.² ......................................... C08L 63/00
[58] Field of Search ................ 260/79, 823, 830 S; 428/411

[56] References Cited

UNITED STATES PATENTS

| | | | |
|---|---|---|---|
| 3,813,368 | 5/1974 | Villa | 260/79 |
| 3,882,091 | 5/1975 | Villa | 260/79 |
| 3,919,147 | 11/1975 | Villa | 260/26 |

*Primary Examiner*—Melvyn I. Marquis
*Attorney, Agent, or Firm*—Stanley A. Marcus; Royal E. Bright

[57] ABSTRACT

Polysulfide polymers modified with epoxy groups are effective as adhesive additives for liquid polysulfide polymer based compositions used as sealants or bonding agents on various substrates such as glass or aluminum.

6 Claims, No Drawings

EPOXIDE MODIFIED POLYSULFIDE POLYMERS AS ADHESIVE ADDITIVES FOR LIQUID POLYSULFIDE POLYMER BASED ADHESIVE COMPOSITIONS

This is a continuation of application Ser. No. 377,161 filed July 6, 1973 now abandoned which is a division of Ser. No. 252,646 filed May 12, 1972, now U.S. Pat. No. 3,813,368.

BACKGROUND OF THE INVENTION

1. Field of the Invention

This invention relates to improved liquid polysulfide polymer based adhesive compositions containing novel adhesive additives. More particularly, this invention relates to improved liquid polysulfide polymer based adhesive compositions containing novel adhesive additives prepared by modifying polysulfide and polyester polymers with abietic acid and polysulfide polymers with epoxy groups.

2. Description of the Prior Art

Curable, liquid polysulfide polymer based sealant and caulking compositions have long been known in the art. They are based on curable, liquid, mercaptan terminated polysulfide polymers. The structure and preparation of these polythiopolymercaptan polymers are disclosed in U.S. Pat. No. 2,466,963. These liquid, mercaptan terminated polymers are used extensively in sealant and caulking compositions, especially in the building, automotive, and marine industries; for castings, e.g., solid rocket propellants; for leather and textile impregnating agents; for adhesives, coatings, etc. Because of the wide range of applications in which these polysulfide polymer based sealing and caulking compositions are used, they must be capable of bonding to various substrates, e.g., metal, aluminum, glass, concrete, wood, etc. However, the adhesive qualities of polysulfide polymers are such as to usually require the use of an adhesive additive in the polysulfide polymer based sealant composition in order to insure adequate bonding of the cured sealant to the substrate.

Adhesive additives of the prior art such as those of a phenolic nature provided only a polar, rather than a chemical, type bonding of the cured sealant to the substrate. Thus, sealant compositions containing phenolic type adhesive additives were found to be susceptible to attack by polar solvents such as water. The polar solvent tended to break down the polar bond thereby impairing the utility of the sealant composition. More recently, as disclosed in U.S. Pat. Nos. 3,297,473; 3,312,669, and 3,328,451, certain organo-silanes e.g., (mercapto alkyl amino alkyl alkoxyl silanes) have been proposed to overcome these problems. However, while the organo-silane adhesive additives have been found to protect the sealant composition bonds from attack by polar solvents, they do have certain disadvantages. Thus, the organo-silane adhesive additives are economically costly, somewhat deficient in storage stability, and exhibit erratic adhesion results with certain substrates, such as concrete.

The object of the present invention, therefore, is to provide a novel liquid polysulfide polymer based caulking or sealant composition which will allow for the attainment of a strong and lasting bonding of the sealant to the substrates to be treated therewith.

Another object of the present invention is to provide a novel liquid polysulfide polymer based caulking or sealant composition containing adhesive additives which are less costly, exhibit improved storage stability, and which exhibit more reproducible and uniform adhesion characteristics to a wider range of substrates.

Other objects of the invention will become apparent to those skilled in the art from a consideration of the following detailed description.

SUMMARY OF THE INVENTION

It has now been unexpectedly found that the objects set forth above can be accomplished by the use of an abietate terminated polysulfide polymer, an abietate terminated polyester polymer, or an epoxy terminated polysulfide polymer as an adhesive additive for the liquid polysulfide polymer based sealant composition.

DESCRIPTION OF THE PREFERRED EMBODIMENTS

As indicated previously, the novel adhesive additives of the present invention are the abietate terminated polysulfide polymers, the abietate terminated polyester polymers, and the epoxy terminated polysulfide polymers. Of these adhesive additives, the abietate terminated polysulfide polymers are preferred because they exhibit more uniform and reproducible adhesion results to various substrates when incorporated into a liquid polysulfide polymer based sealant composition. The abietate terminated polyester polymer and epoxy terminated polysulfide polymer adhesive additives show increased adhesion to certain substrates. However, it has been found that larger quantities of these latter adhesive additives are required to produce increased adhesion results. The use of these adhesive additives in the required quantities often results in some retardation of the cure rate of the sealant composition. Moreover, adhesion results on the abietate terminated polyester polymer and epoxy terminated polysulfide polymer adhesive additives have not proven to be as uniform nor as reproducible as the preferred abietate terminated polysulfide polymer adhesive additive. For that reason, it is recommended that the abietate terminated polyester polymer and epoxy terminated polysulfide polymer adhesive additives be used at not more than 5 parts by weight of additive per 100 parts by weight of liquid polysulfide polymer based on the total weight of the sealing composition. Larger quantities of these adhesive additives may require an adjustment in the amount of curing agents employed.

The abietate terminated polysulfide polymer adhesive additive of the present invention may be prepared by reacting a relatively low molecular weight, e.g., 500 to 4000, preferably 500 to 1500, SH terminated liquid polysulfide polymer (hereinafter referred to as a liquid polythiol polymer) with abietic acid at temperatures of from 150° C to 200° C. The reaction is preferably carried out in a solvent medium and under an inert atmosphere.

The liquid polythiol polymer used as the starting material for reaction with the abietic acid may include those polythiopolymercaptan polymers as are disclosed in U.S. Pat. No. 2,466,963 and which may be represented by the formula HS–(RSS)$_n$–RSH where R is a hydrocarbon, oxahydrocarbon or thiahydrocarbon radical such as the ethyl formal radical

the butyl formal radical

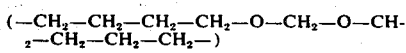

the ethyl radical

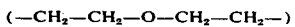

and the butyl ether radical

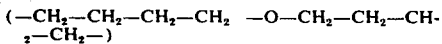

and $n$ will vary from about 4 to 23.

A preferred liquid polythiol polymer will have a molecular weight of 500 to 4000. A particularly preferred liquid polythiol polymer used in the practice of the present invention is a liquid polythiol polymer containing no crosslinking and having a molecular weight of 1000.

While the reaction between the liquid polythiol polymer and abietic acid is not known with exact certitude, it is theorized that the reaction proceeds with inversion of a mercaptan terminal to a hydroxyl terminal followed by esterification. The reaction is believed to proceed in the following manner:

1. 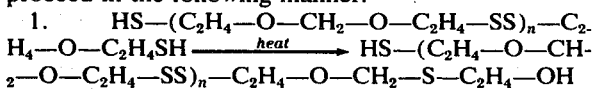

wherein $n$ will vary from 4 to 23.

As indicated previously, the reaction product of the liquid polythiol polymer and abietic acid is believed to be predominantly of the general type structure shown above. However, it should be observed here that the reaction product may in fact contain a mixture of chemical structures. Thus, it is likely that in addition to the above structure, the reaction product may contain structures wherein there are abietate terminals at both ends of the polysulfide polymer chain and in addition may contain unreacted liquid polythiol polymer with SH terminals at both ends of the polymer chain. The predominant type structure obtained is influenced in large measure by the reaction conditions employed. The abietate terminated polysulfide polymer adhesive additive may be incorporated into the liquid polysulfide polymer based sealant composition in amounts of from 0.5 to 3.5 parts by weight per 100 parts by weight of liquid polysulfide polymer.

The abietate terminated polyester polymer adhesive additive may be prepared by any of several procedures. For example, a hydroxyl terminated liquid polyester polymer of relatively low molecular weight e.g. 500 to 2500, preferably 500 to 1500, may be reacted with abietic acid under an inert atmosphere at temperatures ranging from about 140° to 200° C. with or without the presence of a solvent. Alternatively, the individual components which react to form the hydroxyl-terminated liquid polyester polymer may be directly admixed with the abietic acid in a suitable mixing apparatus and then reacted to form the abietate terminated polyester polymer used as the adhesive additive in the compositions of the present invention.

The hydroxyl-terminated liquid polyester polymers which may be reacted with abietic acid to form the abietic terminated polyester polymer adhesive additives of the present invention may be virtually any of those known to the art. These hydroxyl-terminated liquid polyester polymers may be prepared in known manner by reacting diols or polyols with dicarboxylic or polycarboxylic acids under temperature and pressure conditions known in the art. Typical dicarboxylic acids useful in preparing the polyesters include oxalic, adipic, azelaic, sebacic, maleic, and fumaric acids and others, as well as mixtures of these acids. The diols used may include ethylene glycol, diethylene glycols, alkane diols, caster oil and the like. As indicated previously, the liquid polyesters preferably have a molecular weight of 500 to 2500.

Liquid polyester polymers containing sulfur in the polyester molecule are particularly preferred in the 2. 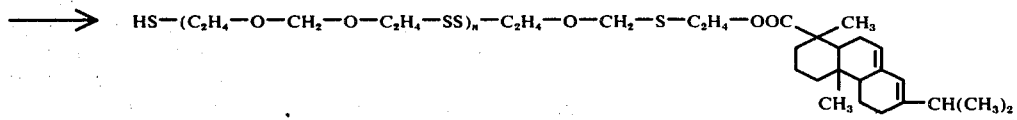

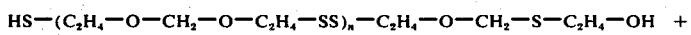

practice of the present invention since they are believed to be more compatible with the liquid polysulfide polymer of the sealant composition. A preferred abietate modified sulfur containing polyester polymer adhesive additive of the present invention may be prepared by mixing and reacting thiodiethylene glycol, azelaic acid, maleic anhydride, and abietic acid under an inert atmosphere at a temperature of 130° to 190° C. The resulting abietate terminated polyester polymer adhesive additive may be incorporated into the liquid polysulfide polymer based sealant composition in amounts ranging from 0.5 to 5.0 parts by weight per 100 parts of liquid polysulfide polymer. At the higher concentration some retardation of the sealant composition cure rate is observed.

The epoxy modified polysulfide polymers used as adhesive additives in the compositions of the present invention may be prepared by reacting a relatively low molecular weight e.g. 500 to 1500, liquid polythiol polymer, such as the liquid polythiol polymer described previously, with a diepoxide such as vinyl cyclohexane diepoxide in a solvent medium in the presence of an acid catalyst. The chemical reaction between the liquid polythiol polymer and vinyl cyclohexane diepoxide is theorized to proceed as follows:

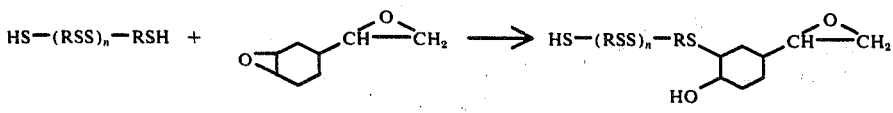

where R is the ethyl formal radical

and $n$ may vary from 4 to 23.

In the above reaction, the epoxy cyclohexane group is reactive under acidic conditions whereas the epoxy ethyl group is reactive under basic conditions. The chemical structure shown above is believed to be the predominant form of the reaction product. However, it should be observed that the reaction product very possibly may consist of a mixture of materials with varying structures. Thus, it is possible that the reaction product in addition to the above structure may contain a product wherein the polysulfide polymer has an epoxy terminal at both ends of the polymer chain or a portion of the reaction product has SH terminals at both ends of the polymer chain.

A particularly preferred epoxy terminated polysulfide polymer adhesive additive of the present invention is prepared by reacting a liquid polythiol polymer of 1000 molecular weight having no crosslinking with vinyl cyclohexane diepoxide in a solvent medium in the presence of an acid catalyst.

The reaction product of a liquid polythiol polymer and a diepoxide is an epoxy terminated polysulfide resin which can be incorporated into the liquid polysulfide polymer based sealant composition in an amount ranging from 0.5 to 5.0 parts by weight of epoxy terminated polysulfide resin per 100 parts by weight of polysulfide polymer. At the higher concentration of adhesive additive, some retardation of sealant composition cure rate is observed.

The liquid polysulfide polymers which form the polymer base of the sealant or caulking compositions with which the novel compounds of the present invention are used as adhesive additives are those liquid polythiopolymercaptan polymers as are disclosed and claimed, as noted above, in U.S. Pat. No. 2,466,963. The most preferred of such polymers for the purposes of making sealant or caulking compositions are those having a molecular weight of about 500 to 4000.

The liquid polysulfide polymer curing agents which may be used in sealant compositions with the novel adhesive additive compounds of the present invention include all those materials known to the art as liquid polysulfide polymer curing agents such as polyepoxy resins, lead peroxide, calcium peroxide, zinc peroxide, lithium peroxide, barium peroxide, tellurium dioxide and the various chromate salts as are disclosed in U.S. Pat. No. 2,964,503. In addition, as disclosed in U.S. Pat. No. 3,487,052 various other inorganic oxides and peroxides, organic peroxides, permanganates, organo tin compounds, organic nitro compounds, and quinoid compounds can often be advantageously used as curing agents for said liquid polysulfide polymers. About 2 to 10 parts by weight of one or more of such curing agents should be used in such compositions per 100 parts by weight of liquid polysulfide polymer being used.

Curable liquid polysulfide polymer based sealant compositions used in conjunction with the adhesive additive compounds of the present invention may also contain various types of inert materials commonly employed in liquid polysulfide polymer based sealant compositions such as fillers, plasticizers, pigments, ultraviolet light stabilizers, cure accelerators, and the like.

The substrates which can be treated with sealant compositions containing the novel adhesive additives of the present invention include those of a wood nature, those of a silicaceous nature such as glass, those of a metallic nature such as aluminum, iron, and steel, and to a limited degree concrete.

In order to illustrate further the nature of the present invention, the following examples are submitted. These examples are merely illustrative of the present invention and are not intended as a limitation upon the scope thereof.

EXAMPLE 1

Preparation of Abietate Terminated Liquid Polysulfide Polymer Resin

A 4000 ml. resin kettle equipped with a Barret trap, a thermometer and adapter, an electric stirrer, a gas inlet tube and a Fredricks condenser was charged with 2000 grams (2 moles) of a liquid polythiol polymer of 1000 mol. weight having no crosslinking, 604.88 grams (2 moles) of abietic acid, and 150 mls. of xylene. The mixture was heated under a nitrogen atmosphere for approximately 1 hour 15 minutes at which time the temperature had reached 190° C. and 10 mls. of $H_2O$ had collected in the Barret trap. The mixture was then heated for approximately 2½ hours at 190° C. at which time 34 mls. of $H_2O$ had collected in the trap. The mixture was heated for an additional 10 minutes and the heat then removed. A sample of resinous product was removed from the resin kettle and analyzed for SH percentage. SH percent was found to be 2.7%. The next morning, heat was again applied to the mixture for approximately 2 hours at 165° C. An additional 6½ mls. of $H_2O$ collected in the trap for a total of 41 mls. of $H_2O$ collected and removed during the reaction. Heat was removed at this time and a sample of resinous product analyzed for SH percentage. Analysis indicated that SH percentage was 0.5%. A vacuum was hooked up to the reaction apparatus and the reaction was heated to 70° C. until all of the xylene had been evaporated. The resinous abietate terminated polysulfide polymer was collected and the acid number and hydroxyl number determined. Results were as follows:

|    | Acid No. | OH No. |
|----|----------|--------|
| 1. | 29.85    | 129.89 |
| 2. | 29.14    | 129.49 |

About 5.5 pounds of abietate terminated polysulfide polymer resin was prepared by the above procedure and used as an adhesive addition in the examples which follow.

EXAMPLES 2–4

Evaluation of The Abietate Terminated Polysulfide Polymer Resin of Example 1 as an Adhesive Additive in Liquid Polysulfide Polymer Based Sealant Compositions In order to determine the effectiveness of the abietate terminated polysulfide polymer resin of Example 1 as an adhesive additive, a liquid polysulfide polymer based sealant masterbatch of the following formulation was prepared using mixing procedures well known in the sealant art:

| Ingredients | Parts by Weight |
|---|---|
| LP-32 Polysulfide Polymer | 100.0 |
| Multiflex MM (Calcium Carbonate) | 25.0 |
| Icecap R (Anhydrous Clay) | 30.0 |
| Titanox RA 50 (Titanium Dioxide) | 10.0 |
| Arochlor 1254 (Chlorinated Diphenyl) | 35.0 |
| | 200.0 |

*LP-32 polysulfide polymer has essentially the structure HS—(—C$_2$H$_4$—O—CH$_2$—O—C$_2$H$_4$—SS)$_{23}$—C$_2$H$_4$—O—CH$_2$—O—C$_2$H$_4$—SH with about 0.5% crosslinking and a molecular weight of about 4000.

A control formulation (Example 2) for this evaluation was prepared by combining the above sealant masterbatch with a lead peroxide curing paste (described hereinafter). One test formulation (Example 3) was prepared by combining the sealant masterbatch with the abietate terminated polysulfide polymer resin and a lead peroxide curing paste. An additional test formulation (Example 4) was prepared by combining the sealant masterbatch with the abietate terminated polysulfide polymer resin and a zinc peroxide curing paste (described hereinafter). The control and test formulations were as follows:

| Formulation | Ex. No. | Parts by Weight 2 | 3 | 4 |
|---|---|---|---|---|
| Polysulfide Sealant Masterbatch | | 200.0 | 200.0 | 200.0 |
| Abietate Terminated Polysulfide Polymer Adhesive Additive | | — | 1.0 | 1.0 |
| Lead Peroxide Curing Paste | | 15.0 | 15.0 | — |
| Zinc Peroxide Curing Paste | | — | — | 22.0 |

The lead peroxide curing paste shown above is a mixture of lead peroxide and arochlor 1254 containing 50% PbO$_2$. Arochlor 1254 is a chlorinated diphenyl plasticizer. The zinc peroxide curing paste shown above is a mixture of zinc peroxide, arochlor 1254, and amax containing 45.5% ZnO$_2$, 45.5% arochlor 1254, and 9% amax. Amax is n-oxy-diethylene benzothiozole-2-sulfamide and is used as a cure accelerator.

Peel adhesion strength specimens bonded to glass and aluminum substrates were prepared from the above formulations. These specimens were exposed to 7 days in air at room temperature, 7 days in an oven at 158° F., and 7 days immersion in room temperature water. Peel adhesion values were obtained upon removal of the specimens from water immersion while the samples were still wet using an Instron tester. The results of the peel adhesion tests are shown in Table I.

TABLE I

| | Adhesion Peel Strength Valves (PSI) Substrate | | | |
|---|---|---|---|---|
| | Glass | | Aluminium | |
| Example | Test 1 | Test 2 | Test 1 | Test 2 |
| 2 (Control) | NA* | NA | NA | NA |
| 3 | 52 | 53 | 28 | 28 |
| 4 | 46 | 53 | 30 | 31 |

*NA = No adhesion

The control specimens showed complete adhesion failure to both the glass and aluminium substrates.

EXAMPLE 5

Evaluation of The Abietate Terminated Polysulfide Polymer Resin As An Adhesive Additive in a Liquid Polysulfide Polymer Based Sealant Composition Utilizing a Calcium Peroxide Curing System In this example, the abietate terminated polysulfide polymer resin was combined with the polysulfide sealant masterbatch shown below, cured with a calcium peroxide curing paste (described below) and then tested for peel adhesion using the procedure described in Examples 2–4.

| Polysulfide Sealant Masterbatch | Parts by Weight |
|---|---|
| LP-32 polysulfide polymer | 100.0 |
| Witcarb RC (precipitated calcium carbonate) | 40.0 |
| Cameltex (calcium carbonate) | 25.0 |
| Titanox RA 50 (titanium dioxide) | 10.0 |
| Thixcin GR (thixotropic agent) | 10.0 |
| Aroclor 1254 (chlorinated diphenyl) | 20.0 |
| Santicizer 160 (butyl benzylphtalate) | 20.0 |
| | 225.0 |

As indicated previously, the above sealant masterbatch was combined with the abietate terminated polysulfide polymer resin and a calcium peroxide curing paste to form the test formulation. The test formulation is shown below.

| Polysulfide Sealant Test Formulation Ingredients | Parts by Weight |
|---|---|
| Polysulfide Sealant Masterbatch | 225.0 |
| Abietate Terminated Polysulfide Polymer Resin | 1.0 |
| Calcium Peroxide Curing Paste | 37.5 |

The above calcium peroxide curing paste is a mixture of CaO$_2$, Titanox RA 50, Calcium Hydroxide, and Arochlor 1254 containing 26.7% CaO$_2$, 13.3% Titanox RA 50, 6.6% Calcium Hydroxide, and 53.4% Arochlor 1254.

As indicated previously, the above formulation was tested for peel adhesion strength using the procedure described in Examples 2–4. Test results are shown in Table II.

TABLE II

| | Adhesion Peel Strength Valves (PSI) Substrate | | | |
|---|---|---|---|---|
| | Glass | | Aluminium | |
| Example | Test 1 | Test 2 | Test 1 | Test 2 |
| 5 | 46 | 53 | 30 | 31 |

EXAMPLES 6–7

Evaluation of The Effect of The Abietate Terminated Polysulfide Polymer Resin on the Storage Stability of a Two Package Polysulfide Polymer Based Sealant Composition In these examples, the effect of the abietate terminated polysulfide polymer resin on the storage stability of a two package sealant composition was determined by admixing said resin with the polysulfide sealant masterbatch used in examples 2–4 and then aging the admixture in an oven for 7 days at 158° F. A sample of the above oven aged admixture was then combined with lead peroxide curing paste to form one test formulation (Example 6) while an additional sample of the oven aged admixture was combined with zinc peroxide curing paste to form a second test formulation (Example 7). Specimens of the test formulations bonded to aluminum and glass substrates were then prepared for peel adhesion strength tests in accordance with the procedure described in Examples 2–4. The test specimens were then aged for 7 days in air at room temperature, 7 days in an oven at 158° F., and 7 days immersed in room temperature water.

In essence, this evaluation serves to measure the effect of high temperature storage on a two package sealant composition wherein the abietate terminated polysulfide polymer resin is incorporated into the liquid polysulfide polymer based sealant package. Thus, the test is also a measure of the storage stability of the resin as an adhesive additive.

The test formulations and peel adhesion values as determined on a Instron tester are shown in Table III.

TABLE III

| | | Parts by Weight | |
|---|---|---|---|
| Test Formulations | Ex. No. | 6 | 7 |
| Polysulfide sealant masterbatch | | 200.0 | 200.0 |
| Abietate terminated polysulfide polymer resin | | 1.0 | 1.0 |
| Lead peroxide curing paste | | 15.0 | — |
| Zinc peroxide curing paste | | — | 22.0 |

| | Adhesion Peel Strength (PSI) Substrate | | | |
|---|---|---|---|---|
| | Glass | | Aluminium | |
| Example | Test 1 | Test 2 | Test 1 | Test 2 |
| 6 | 75 | 77 | 29 | 38 |
| 7 | 41 | 38 | 30 | 28 |

The above peel strength data indicates that the abietate terminated polysulfide polymer resin did not adversely affect peel strength adhesion values of the polysulfide sealant composition even when exposed to high temperature aging storage conditions. In fact, when compared to the peel adhesion values of Table I wherein the same compositions were tested without prior oven aging of the sealant masterbatch, these adhesion results are equal to or better than the results shown therein. Thus, the abietate terminated polysulfide polymer resin exhibits excellent storage stability.

EXAMPLE 8

Preparation of Abietate Terminated Polyester Resin Adhesive Additive

A 1000 ml. resin pot equipped with a Barret trap, a thermometer and adapter, an electric stirrer, a gas inlet tube, and a Fredricks Condenser is charged with 299.20 grams (2.45 moles) of thiodiethylene glycol, 165.35 grams (0.88 moles) of azelaic acid, 86.02 grams (0.88 moles) of maleic anhydride, and 170.00 grams (0.56 moles) of abietic acid. The mixture was heated under a helium atmosphere for about 1½ hours at temperatures of 130° to 150° C., at which time 29 mls. of $H_2O$ had collected in the trap. The mixture was permitted to stand overnight. The next morning heat was again applied to the reaction mixture and it was heated for 2 hours at which time the temperature was 190° C. and a total of 55 mls. of $H_2O$ had collected in the trap. At this time, approximately 35 mls. of xylene were added to the reaction mixture. The mixture was then heated for an additional 6 hours at temperatures ranging from 185° to 200° C. at which time a total of approximately 64 mls. of $H_2O$ had collected in the trap. At this point, the reaction mixture had been heated for a total of approximately 8 hours. The reaction mixture was again permitted to stand overnight. The next morning heat was again applied to the reaction mixture and the mixture heated for approximately 6 hours at temperatures of 150° to 175° C. at which time a total of about 66 mls. of $H_2O$ had collected in the trap. At this time, heat was removed and the reaction mixture allowed to cool to 100° C. A vacuum system was then hooked to the reaction mixture apparatus and the reaction heated at 150° C. for 2 hours under 7 mm of Hg pressure to remove any $H_2O$ or solvent remaining in the resinous product. A sample of resin product was analyzed for OH No. and acid No. with the following results: OH No. = 13.11, acid number = 37.40, 38.72. A total of 645 grams of abietate terminated polyester resin were produced during the reaction.

EXAMPLES 9–12

Evaluation of Abietate Terminated Polyester Resin As An Adhesive Additive In Polysulfide Sealant Formulations In these examples, the abietate terminated polyester resin of Example 8 was evaluated at 1% and 5% levels in the polysulfide sealant masterbatch of Examples 2–4 according to the following formulations:

| | | Parts by Weight | | | |
|---|---|---|---|---|---|
| Formulation | Ex. No. | 9 | 10 | 11 | 12 |
| Polysulfide Sealant Masterbatch | | 200.0 | 200.0 | 200.0 | 200.0 |
| Abietate Terminated Polyester Resin | | 1.0 | 5.0 | 1.0 | 5.0 |
| Lead Peroxide Curing Paste | | 15.0 | 15.0 | — | — |
| Zinc Peroxide Curing Paste | | — | — | 22.0 | 22.0 | to form the curable sealants 8, 9, 10, and 11. The above sealant compositions were applied as beads in duplicate to clean unprimed glass, aluminum, and concrete panels and left to cure for 7 days in air at room temperature. One set of duplicates was tested for adhesion. The other set of panels was then immersed in tap water for 7 days at room temperature and then tested for adhesion. The adhesion tests consisted of attempting to peel the cured sealant beads from the substrates. If the bead could not be removed without tearing the bead, this was noted as a cohesive failure. If the bead peeled off it was noted as an adhesive failure. If the bead separated during water immersion or if virtually no force was required to remove the bead, it was noted as having no adhesion (NA). Results of these adhesion tests are shown in Table IV.

liquid polythiol polymer contained an estimated 6.4% SH and the vinyl cyclohexane reactant contained an estimated 0.34% epoxy groups. The reaction mixture was heated to 50° C. for 6 hours and 55 minutes. At this time, the reaction mixture was heated to reflux at 113° C. for 7 hours and 40 minutes. During this period, the reaction mixture was sampled and analyzed for SH% and epoxy %. Analysis of these groups showed less than 50% reduction in SH% and epoxy %. Accordingly, the mixture was permitted to stand overnight. On the next day, heat was again applied to the reaction mixture and it was heated for an additional 6 hours at 111° C. At this point, a sample of reaction product was analyzed and SH% was found to equal 3.39% and epoxy percent was found to equal 0.171%. This indicated an approximate reduction of 50% in the original SH and epoxy

TABLE IV

| Conditions | | | 7 Days in Air at Room Temp. | | | 7 Days in Water | | |
|---|---|---|---|---|---|---|---|---|
| Substrate | | | Glass | Aluminum | Concrete | Glass | Aluminum | Concrete |
| Example No. | % Additive | Curing Agent | | | | | | |
| 9 | 1 | PbO$_2$ paste | C | NA | NA | C | A | NA |
| 10* | 5 | PbO$_2$ paste | C | NA | NA | NA | A | NA |
| 11 | 1 | ZnO$_2$ paste | C | NA | NA | NA | NA | NA |
| 12* | 5 | ZnO$_2$ paste | C | C | NA | NA | NA | NA |

*At the 5% level of adhesive additive, the sealant compositions were not completely cured.
Code:
C = Cohesive Failure
A = Adhesive Failure
NA = No adhesion The data indicates that the sealant composition containing 1% adhesive additive and lead peroxide curing agent (Example 8) gave good adhesion to glass in both the air and water tests.

EXAMPLE 13

Preparation of Epoxy Terminated Polysulfide Resin Adhesive Additive

A 500 ml. B necked RB flask equipped with an air condenser, thermometer, stirring rod and mixer was charged with 100 mls. of Dioxane, 0.5 grams p-toluene sulfonic acid, 200 grams of liquid polythiol polymer containing no crosslinking and having a molecular weight of 1000, and 59 grams of vinyl cyclohexane diepoxide. The reaction was designed to terminate when a 50% reduction of the estimated SH% and epoxy group % of the original reactants was obtained. The group percentages. The reaction mixture was then placed in a rotor vacuum water asperator and a hot water bath to evaporate the solvent. The experimental procedure yielded 211.2 grams of product. Total heating time of the reaction mixture was about 20 hours.

EXAMPLES 14-17

Evaluation of Epoxy Terminated Polysulfide Resin as an Adhesive Additive in a Polysulfide Sealant Composition In these examples, the epoxy terminated polysulfide resin of Example 12 was evaluated in the polysulfide sealant masterbatch of Example 2 at a 1% and 5% level in the following formulations:

| Formulation | Ex. No. | Parts by Weight | | | |
|---|---|---|---|---|---|
| | | 14 | 15 | 16 | 17 |
| Polysulfide Sealant Masterbatch | | 200.0 | 200.0 | 200.0 | 200.0 |
| Epoxy Terminated Polysulfide Resin | | 1.0 | 5.0 | 1.0 | 5.0 |
| Lead Peroxide Curing Paste | | 15.0 | 15.0 | — | — |
| Zinc Peroxide Curing Paste | | — | — | 22.0 | 22.0 |

Adhesions of the above curable formulations were run in accordance with the procedure described in Examples 8-11. Adhesion results are shown in Table V.

TABLE V

| Conditions | | | 7 Days in Air at Room Temp. | | | 7 Days in Water | | |
|---|---|---|---|---|---|---|---|---|
| Substrate | | | Glass | Aluminum | Concrete | Glass | Aluminum | Concrete |
| Example No. | % Additive | Curing Agent | | | | | | |
| 14 | 1 | PbO$_2$ paste | A | NA | C | NA | NA | NA |
| 15 | 5* | PbO$_2$ paste | C | C | C | C | C | NA |
| 16 | 1 | ZnO$_2$ paste | C | NA | C | NA | NA | NA |

TABLE V-continued

| Conditions Substrate | | | 7 Days in Air at Room Temp. | | | 7 Days in Water | | |
|---|---|---|---|---|---|---|---|---|
| | | | Glass | Aluminum | Concrete | Glass | Aluminum | Concrete |
| Example No. | % Additive | Curing Agent | | | | | | |
| 17 | 5* | ZnO$_2$ paste | C | C | C | C | C | NA |

*Some minor cure retardation noted at 5% level of additive in both ZnO$_2$ and PbO$_2$ cured stocks Code:
C = Cohesive Failure
A = Adhesive Failure
NA = No Adhesion The above data shows that the epoxy terminated polysulfide adhesive additive at the 5% level gave excellent adhesion to glass and aluminum substrates in both the ZnO$_2$ and PbO$_2$ cured sealants and in both air and water adhesion tests.

Now having fully described my invention, I claim:

1. A curable liquid polysulfide polymer based sealant composition containing, as an adhesive additive, 0.5 to 5.0 parts by weight of epoxy terminated polysulfide resin per 100 parts by weight of curable liquid polysulfide polymer.

2. The sealant composition of claim 1 wherein the epoxy terminated polysulfide resin is epoxy terminated substantially at one end of the polymer chain.

3. The sealant composition of claim 2 wherein the epoxy terminated polysulfide resin is the reaction product prepared by reacting a liquid polythiol polymer having a molecular weight of 500 to 4000 and vinyl cyclohexane diepoxide until about a 50% reduction in the percent thiol and epoxy functions in the reaction mixture has been obtained.

4. The sealant composition of claim 2 containing about 2.0 to about 10.0 parts by weight of liquid polysulfide polymer curing agent.

5. The sealant composition of claim 3 containing
   a. 100 parts by weight of curable liquid polysulfide polymer base,
   b. about 0.5 to about 5.0 parts by weight of epoxy terminated polysulfide resin, and
   c. about 2.0 to about 10.0 parts by weight of liquid polysulfide polymer curing agent.

6. The sealant composition of claim 5 wherein the epoxy terminated polysulfide resin is derived from a liquid polythiol polymer which is non-cross linked and has a molecular weight of 1000.

* * * * *